March 29, 1960
H. C. JOHNSON
2,930,554
EXPLOSIVE DEICER
Filed Feb. 1, 1957
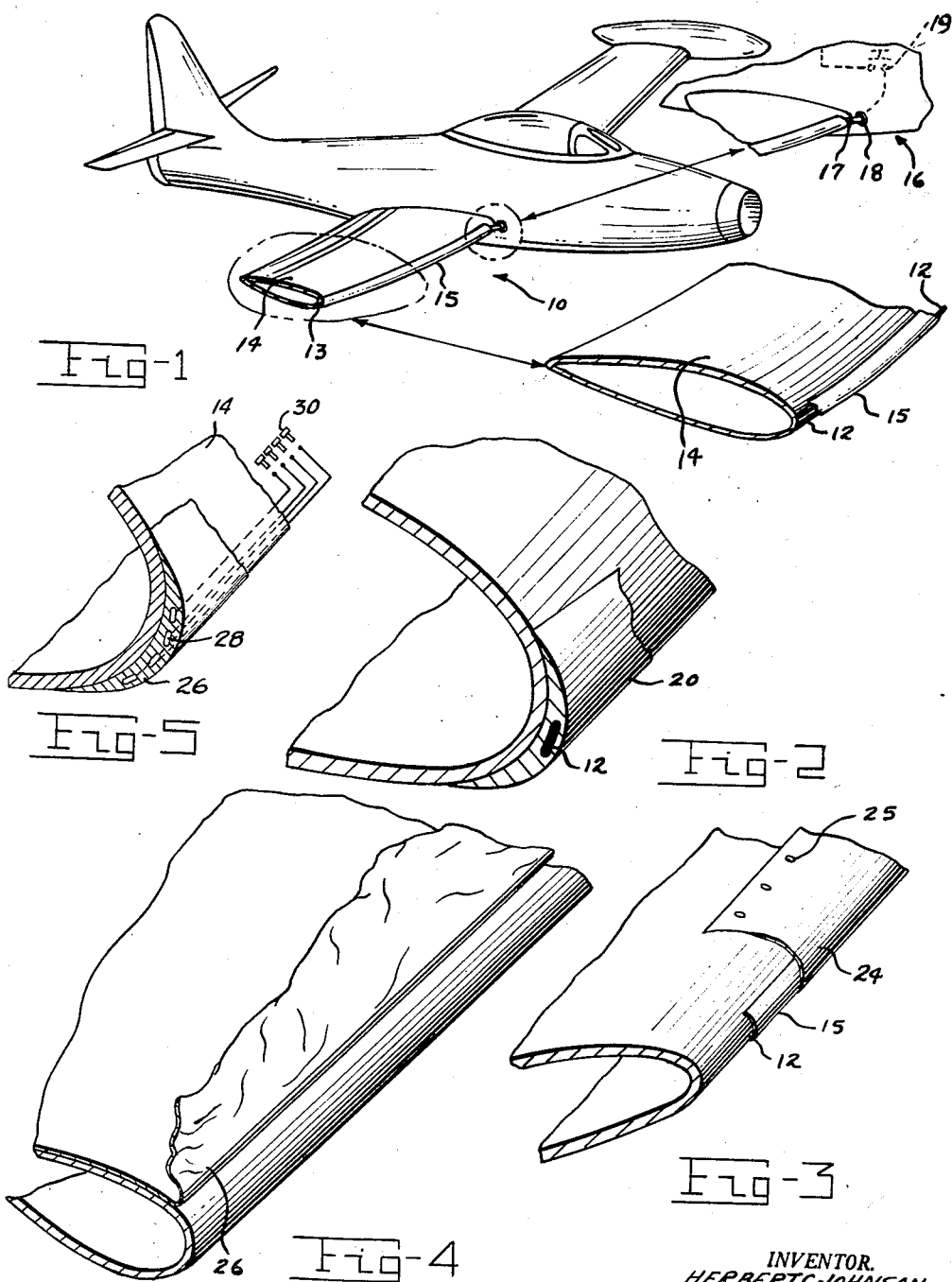
INVENTOR.
HERBERT C. JOHNSON
BY
ATTORNEYS

United States Patent Office 2,930,554
Patented Mar. 29, 1960

2,930,554

EXPLOSIVE DEICER

Herbert C. Johnson, Minneapolis, Minn., assignor to the United States of America as represented by the Secretary of the Air Force Application February 1, 1957, Serial No. 637,848

11 Claims. (Cl. 244—134)

The present invention relates to an explosive deicer apparatus in which an explosive primer cord or the like is secured to the leading surface portions of an aircraft for predetermined detonation, by pilot control means or automatically, to shed the accumulation of ice on the leading surfaces; and further relates to the use of fairing strips and expendable leading edges in conjunction with the above explosive cords to establish a protective covering superimposed on the airfoils of an aircraft.

The requirements of aircraft icing protective systems for piloted and nonpiloted supersonic aircraft have been found to differ substantially from the subsonic aircraft in former use. The present aircraft normally operate above altitudes where icing usually occurs and are capable of attaining speeds wherein aerodynamic heating precludes the formation of ice on forward surfaces. Furthermore, the construction of modern aircraft does not lend itself readily to the installation of the conventional protective systems as did prior designs. For instance, sharp leading edges, thick skins and extreme weight limitations would complicate the use of conventional systems.

It is therefore proposed to provide a limited ice removal or ice prevention system which can be externally applied to the surfaces requiring protection so that they may be attached or removed at will and may also be used on previously fabricated surfaces. Since the modern high altitude aircraft do not normally operate at altitudes where icing occurs, it is necessary only to provide a system which can be selectively or periodically actuated upon ascent or descent through ice forming layers. Also in supersonic aircraft where aerodynamic heating at high altitudes precludes the formation of ice, an ice removal system would only be necessary after the aircraft has descended through an ice forming layer.

Further considerations in the application of a limited ice removal system to high speed aircraft include the restriction of the size and weight of the system so as not to impose substantial performance penalties on the parent aircraft. Both the size and weight, of course, will effect the overall drag of the aircraft, even though no power is utilized for the operation of the system. In addition, the external portion of such a limiting system should be capable of being applied with minimum effort even under adverse conditions.

It is a consequent and primary object of the present invention to provide a reliable, lightweight ice removal system which can be rapidly attached, selectively energized and released in order to shed the accumulation of ice surrounding the removal system with minimum distortion to the profile of the leading surfaces.

It is another object to provide an explosive deicing system having comparatively low drag characteristics in which a false, expendable leading edge is utilized to collect the ice tending to accumulate on the leading surface portions of an aircraft.

It is another object to provide an automatic, compact and lightweight ice removal system which can be adhesively applied to the leading surface portions of an aircraft with minimum increase in drag to said portions and which can be energized for the predetermined release of the system together with the accumulated ice.

An additional object is to provide an explosive, automatic deicing system utilizing a streamlined, frangible covering which can be explosively detached for the predetermined removal of ice from the airfoils of an aircraft.

A further object is to provide an explosive deicing system wherein a detonating cord, or cords, spanning the length of the leading edge portion of an airfoil is responsive to an electrically initiated shock across the cord to transmit an explosive force sufficient to break up the accumulation of ice along the leading surface portion of the airfoil.

It is still a further object to provide an explosive cord incorporated within a fairing strip applied to the leading surface portion of an airfoil which may be used by itself or in conjunction with an expendable leading edge and which is operative to sever the fairing strip and auxiliary cover such that it sheds the accreted ice and expendable covering, thereby clearing the entire leading edge region of ice for as far aft as the covering extends.

These and other objects and advantages of the present invention will be apparent from the following description and accompanying drawings in which like numerals are employed to designate like parts, and in which:

Fig. 1 is a perspective view illustrating the preferred form of explosive deicing system and including fragmentary, exploded views of the detonating cords which are adhesively applied to the leading edge of the wing, and an initiating cap electrically connected to pilot control means at the wing juncture of the aircraft;

Fig. 2 is a perspective view of a modified form of explosive deicer in which a molded, rubber fairing is adhesively applied to the leading surface of an airfoil with the detonating cord embedded within the rubber fairing;

Fig. 3 is another modified form of explosive deicer in which an expendable foil is superimposed over the deicers shown in Figs. 1 and 2 to extend the ice removal capacity of the system;

Fig. 4 is another modified form of invention in which a sprayed, strippable film is utilized in place of the expendable foil to completely cover the airfoil surface.

Fig. 5 is a view of a further modified form.

In the preferred embodiment of the present invention as set forth in Fig. 1, there is shown an explosive deicing system 10 broadly comprised of a miniaturized primer or explosive cord 12 which is adhesively applied to the leading edge 13 of an airfoil 14 by means of pressure sensitive tape 15, along with a detonating unit 16 which includes a suitable initiating cap or detonator 17 attached to one end of the detonating cord, with wire leads 18 to connect the cap or detonator into a detonating circuit (not shown) by means of quick-disconnect plugs at the wing and fuselage junction. The circuit itself, which forms no part of the present invention, can be energized from the aircraft electrical system and actuated by a switch in the pilot compartment.

The detonating cord 12 can be composed of any standard type of exposive, such as TNT or nitrocellulose, and for purposes of the present invention, a standard nitrocellulose explosive was inclosed in an outer, malleable sheath which was rolled into a flattened strip having a rectangular cross section, 0.020 inch by 0.180 inch. In the rolling process, the cord was stretched considerably so that the cross sectional areas were reduced by almost one-half. In this way, the cord itself was shaped to more readily conform to the contour of the leading edge of the wing surface.

In order to permit ease of attachment and severance of the deicer the cord is embedded in a pressure sensitive tape which is applied over the leading edge of the wing surface so as to cover the forward contour of the wing. The tape itself should have an adhesive strength sufficient to hold the cord in place against the pressure of the slip stream yet will be disconnectible upon energization of the cord. In the preferred embodiment, the tape used is of aluminum composition, 0.005 inch thick, and has an adhesive strength of 60 oz. per inch of weight. The simple, but unique application of tape along with the explosive cord in this manner is highly advantageous not only because it permits the complete severance of the cord but also the tape serves as a fairing as well to provide extremely low drag characteristics in comparison with present systems.

The initiating cap or detonator 17 is attached to a cleanly cut end of the cord adjacent the fuselage section and positioned about 2 inches away from the leading edge skin to preclude skin damage. The cap and end of the explosive are held tightly together in close contact by insertion into the opposite ends of a plastic tubing. Pilot control means are shown schematically at 19 in Fig. 1.

An alternate form of fairing strip to be used in conjunction with the explosive cord is a molded rubber casing 20 as shown in Fig. 2. The casing itself is frangible and is molded to the desired shape with the detonating cord centrally located along the length of the casing. The casing can be fastened to the wing by the use of pressure sensitive tape applied over the casing and leading surface or by the application of double-sided, pressure sensitive adhesive between the inner surface of the casing and leading surface of the wing. Of course other suitable means may be used in place of the adhesive to make the desired attachment. Again, in this alternate form the detonating cord is shaped to somewhat conform to the contour of the leading edge and casing itself to secure uniform spacing between the ice layer surrounding the casing and outer surface of the explosive. In this way, the directional force of the explosive can be controlled to apply a more uniform shock force in an outward direction which will effectively sever the casing and accreted ice cap.

With the use of the molded rubber fairing 20 the detonating unit is attached in the same manner and separated in the same manner as with the use of pressure sensitive tape. The molded rubber casing does possess some advantage over the use of tape alone in that additional insulation is provided between the detonating cord and leading surface portion of the wing to minimize distortion to the leading surface profile upon explosion, although the rubber casing is more expensive and bulkier.

Further modified forms of the present invention are illustrated in Figs. 3, 4 and 5 in which auxiliary coverings are utilized to further extend the shedding area. In the forms shown in Figs. 1 and 2, the fairing is applied to the leading surface only, since little run back icing occurs and also, the ice build-up at the leading edge tends to shield the aft surface, thus reducing the extent of impingement. Of course, due to the ability of an explosive system to transmit a shock force beyond the contact area, such a system has the advantage of protecting a greater area than is actually covered. However, where it is desired to further extend this coverage, the fairing strip and embedded cord can be used as a primary shedding force with a secondary sheddable film superimposed over the fairing and wing portion to be covered as shown in Figs. 3 and 4. In this form, the ice formation is shed in a different manner: Upon energization of the detonating cord, severance of the cord and fairing will operate to split the auxiliary covering at the leading surface so as to force the forward edges of the covering into the slip stream whereupon the additional drag will peel off the covering and attached ice.

Fig. 3 sets forth the application of one form of auxiliary covering or expendable leading edge wherein a frangible foil 24 can be attached to the wing surface by means of a double sided, pressure-sensitive tape interconnecting the inner surface of the foil and the wing surface at spaced intervals, or by rivet nuts 25 as shown. As in the previously described forms of the present invention, the adhesive force of tape or attachment means must be sufficiently high to hold the foil or film in place against pressure of the slip stream, yet allow the foil to be pulled free by the slip stream once it is released. The expendable edge material must also be lightweight, waterproof and capable of being applied to aircraft surfaces without wrinkling. Successful forms introduced include copper foil, aluminum foil with integral adhesive to eliminate the use of tape, and polyethylene films either applied by means of tape or integral adhesive. Depending on the size and type of the foil or film on release, the adhesive should have varying strength qualities; for instance, with the use of copper foil the tape is afforded an adhesion of 40 ozs. per inch of width according to ASTM standards.

In Fig. 4, attachment is made by means of rivets wherein extended coverage is provided by the foil to approximately one-half of the upper and lower wing surfaces extending rearwardly from the leading edge. An advantage in attaching rivets 25 to the trailing edges of the foil on the upper and lower surfaces of the wing is that a more rapid release is attained upon splitting since the foil will be freed immediately at the leading surfaces.

Frangible foil or the like can also be utilized to cover the entire airfoil surface area, if necessary. Also, in place of the use of foil for either extended, partial coverage or complete coverage, a strippable film 26 can be applied over the airfoil and fairing strip surface either by brushing or spraying, as shown in Fig. 4. A common type of material for this purpose, particularly in the spraying process, is a synthetic resin-base material commonly used to protect polished metal surfaces during fabrication process or the like. Its adherence to other surfaces is low and in addition, it has considerable film strength. One illustrative material is a Borden Company No. 2341-13 film which can be applied either by spraying with a conventional spray gun or by brushing. Brushing is a somewhat faster means of application since it does not require as many coats for a desired thickness, although the spray will give a more uniform and smoother surface. The sprayed or brushed strippable film is advantageous in that it can be quickly applied, does not adhere too strongly to the surface, yet is quickly releasable upon severance at the leading edges and will not leave any residuary adhesive material on the wing surfaces.

In all the systems employed, it can be seen that the use of a lightweight system for either the partial or complete removal of ice, attachable and releasable in an optimum period of time, can be accomplished with consequent, minimum drag characteristics during flight. As set forth these preferred systems are one shot systems; that is, the detonating cord is energized but once during a particular flight operation. However, this has not been found to be particularly disadvantageous since present day high performance aircraft normally operate at altitudes above the zones where icing normally occurs and hence are only exposed during the initial climb and/or final letdown portions of the aircraft's basic mission. Moreover, high speed aircraft normally generate sufficient heat aerodynamically to remove the ice after the initial climb so that a deicing system would only be necessary after descent. Where it would be more expedient to form a multiple shot deicing system the use of pressure sensitive tape with a plurality of detonating cords embedded in juxtaposed relation along the length of the tape would be most practical. In using this construction the detonating circuit would be connected to the cords so as to detonate each alternate cord or group of cords.

It is to be further noted that, in place of a single detonating cord directly adjacent the leading edge, a plurality of cords may be fastened to the leading surfaces of the airfoils both above and below the leading edge so as to exert a greater shock force upon the accreted ice cap. This is illustrated in Fig. 5 where the casing 26 formed of molded rubber or other material is made with a plurality of channels for accommodating a plurality of explosive cables 28. These cables are capable of being selectively detonated from a remote point as shown at 30 in Fig. 5. They may be detonated singly at selected intervals, in groups, or all at once as experience dictates. As a comparison, it has been found that with the use of a single strip of cord, as described, applied at the leading edge, detonation of the cord would cleanly remove all ice accretion at least as far back as the 6% cord point on both the upper and lower leading surfaces, regardless of the amount of accretion or the cord configuration, whereas by locating detonating cords about 4% aft of the leading edge on both the upper and lower surfaces the ice was completely removed back to approximately the 25% cord point.

In that there is some damage potential associated with the use of explosives, it is preferable to use the explosive deicer on a thick-skinned profile and to space the explosive cord by means of wrapping or insulation from the wing surface, or by the use of fairings.

To summarize, the present invention makes possible the attainment of a positive, reliable means of ice removal which is easy to secure and release, with minimum drag imposed on the aircraft and providing simplicity of operation. Moreover, the systems are conformable for use with all types of modern aircraft and will operate under the severest conditions. It is to be understood that variations may be made in the above systems as described without departing from the scope of the invention as defined in the following claims.

I claim:

1. An explosive deicing system to release the accumulation of ice on the leading surfaces of an air craft or the like, comprising: an elongate fairing strip to cover a leading surface, a plurality of explosive cords embedded in juxtaposed relation within said strip, said cords responsive to a low voltage pulse to impart an impact force to said fairing strip sufficient to rupture said strip together with the ice formation surrounding said strip, and control means connected to said cords for the selective energization thereof.

2. An explosive deicing apparatus to remove the accretion of ice on the leading surface portions of an aircraft or the like, comprising: a molded, lightweight fairing releasably fastened to the forward contour of the wing surface, an explosive cord disposed within said fairing and extending the length thereof, and means electrically connected to said cord for the energization of said cord to sever and release said fairing and accreted ice.

3. An explosive deicing apparatus according to claim 2 in which said fairing is releasably fastened to the forward contour by means of frangible tape having a strength of adhesion sufficient to secure said fairing in place and to permit release of said fairing upon severance by said cord.

4. A single shot, explosive deicing apparatus to shed the accumulation of ice on aircraft wing surfaces or the like, comprising: primary shedding means adhesively secured to the leading surfaces of the wings, said shedding means including an outer, flexible fairing member spanning each leading edge so as to conform to the contour thereof and a flat, rolled detonating cord embedded within said fairing member and extending the length thereof; a secondary sheddable film covering said primary shedding means and the wing surface, said sheddable film consisting of lightweight, frangible sheets and adhesive means to hold said sheets in place against the action of the slip stream and to permit release of said sheets upon actuation of said detonating cord; and pilot control means connected to said cord to energize said cord for the severance and release of said primary shedding means and said secondary sheddable film.

5. A deicing apparatus according to claim 4, in which: said sheddable film consists of a metallic foil and double-sided, pressure-sensitive tape interconnecting the wing surfaces and foil.

6. A deicing apparatus according to claim 4 in which said adhesive means are characterized by rivets for fastening the trailing edges of said frangible sheets to said wing surfaces.

7. A deicing apparatus for explosively removing the accumulation of ice on aircraft wing surfaces or the like, comprising: a primary shedding member externally secured to the forward contour of the wing surfaces having a frangible, adhesive tape spanning each leading edge and conforming to the contour thereof and a low voltage, explosive cord embedded therewithin; a secondary shedding member applied over said primary shedding member and the wing surface, said secondary member consisting of a sprayed, strippable film to receive the accumulation of ice on the wing surfaces; and pilot control means connected to said explosive cord to energize said cord for the severance of said primary and secondary shedding members along the leading edge whereupon said primary and secondary shedding members are removed from the wing surfaces by the force of the air stream, together with the accreted ice.

8. An explosive deicing device for removing the accumulation of ice from the surface portions of an aircraft comprising a cord containing an explosive substance positioned on a surface to be protected, an adhesive substance applied to said cord for attaching said cord to said surface, detonating means for detonating said explosive, said detonating means being operable by remote control.

9. An explosive deicing device for removing ice from the surface portions of aircraft according to claim 8 wherein the cord containing said explosive substance is flattened to conform to the contour of the surface to which it is attached.

10. A single-shot deicing system for shedding formations of ice on air foil surfaces comprising a strip of frangible material attached along the leading surfaces of said airfoil, an explosive embedded in said strip for severing said strip from said airfoil, electrical means for detonating said explosive for breaking accumulated ice on said airfoil surfaces, said detonating means being operable by remote control.

11. An explosive deicing system for shedding accumulated ice on airfoils comprising an elongated fairing strip adhesively secured to a leading surface of said airfoil, an explosive substance embedded in said strip along the length thereof for severing said strip from said airfoil, a detonator for said explosive located at the pilot's position and operable therefrom, whereby said strip is detached from said airfoil upon operation of said detonator by said pilot and accumulated ice is thereby removed.

References Cited in the file of this patent

UNITED STATES PATENTS 2,106,323    Huntington  ------------- Jan. 25, 1938

FOREIGN PATENTS 98,343    Sweden  ---------------- Mar. 12, 1940